United States Patent [19]
Walker, Jr. et al.

[11] 3,955,648
[45] May 11, 1976

[54] REMOVABLE TYPE LUBRICATING FITTING

[76] Inventors: Frank J. Walker, Jr., P.O. Box 1178; Frank J. Walker, Sr., 9800 NE. 5th Ave. Road, both of Miami, Fla. 33138

[22] Filed: Oct. 15, 1974

[21] Appl. No.: 515,095

Related U.S. Application Data

[63] Continuation-in-part of Ser. No. 367,186, June 5, 1973, abandoned.

[52] U.S. Cl. ............................ 184/105 B; 137/351; 137/533.11; 137/525.3; 141/383
[51] Int. Cl.² ...................................... F01M 11/04
[58] Field of Search .......... 184/1 R, 1 D, 28, 105 R, 184/105 A, 105 B, 105 C; 137/533.11, 525.3, 351; 128/2 F; 215/260, 329; 141/383, 384

[56] References Cited
UNITED STATES PATENTS

| | | | |
|---|---|---|---|
| 884,275 | 4/1908 | Haywood | 184/105 R |
| 2,797,703 | 7/1957 | Edwards | 184/105 B X |
| 2,834,376 | 5/1958 | Hughes | 184/105 R X |

FOREIGN PATENTS OR APPLICATIONS

| | | | |
|---|---|---|---|
| 553,939 | 1957 | Italy | 137/533.11 |

*Primary Examiner*—Richard C. Pinkham
*Assistant Examiner*—William R. Browne
*Attorney, Agent, or Firm*—Mason, Fenwick & Lawrence

[57] ABSTRACT

A lubrication fitting having a unique fluid flow control device mounted in an opening to prevent flow of fluid therethrough at all times except when specifically actuated to permit fluid flow therethrough. Upon actuation, the fluid flow control device automatically permits flow of lubricant into a reservoir, while at the same time automatically prevents flow of fluid out of a reservoir unless additionally actuated specifically for the purpose of withdrawing fluid from the reservoir. The fitting has a closure plug that has external threads that threadably engage the internal threads in a recess in the fitting. The recess in the fitting communicates with a passage in the fitting to form a continuous passage through the fitting for a lubricant being forced into a reservoir. The fluid flow control device is constructed so as to provide an essentially leak-free junction with the dispensing source of lubricant and may include a magnet to attract and remove ferrous metal particles from the lubricant.

7 Claims, 11 Drawing Figures

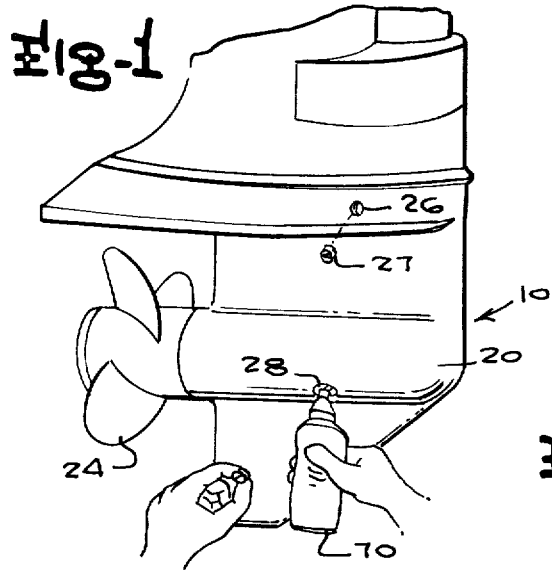
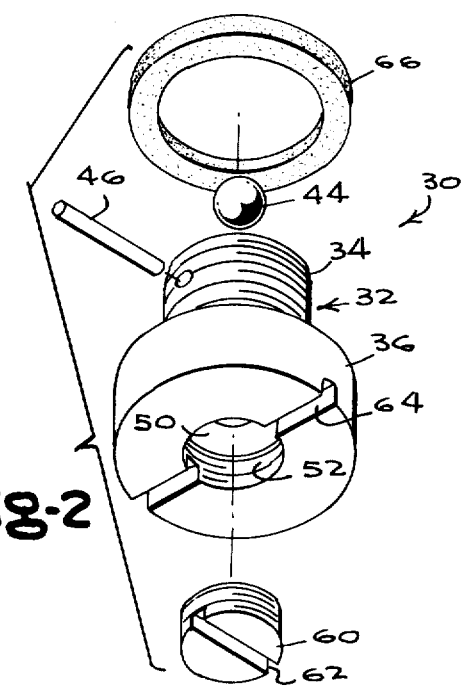
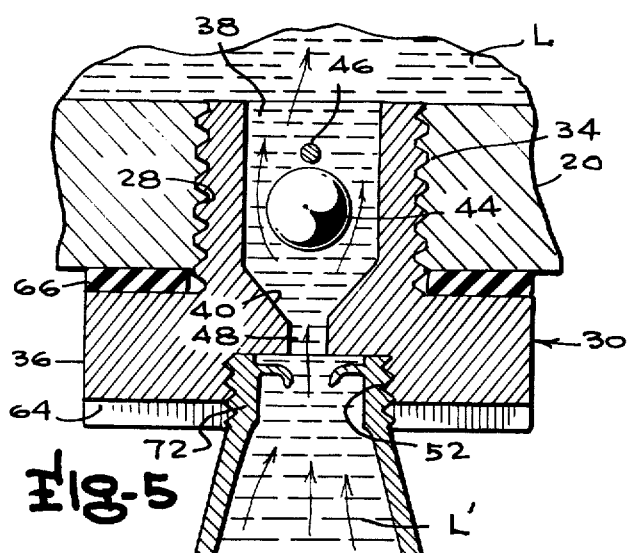
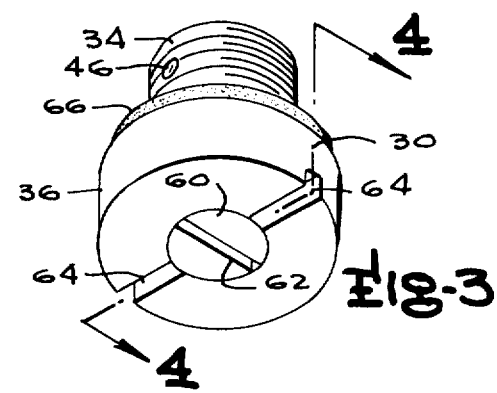
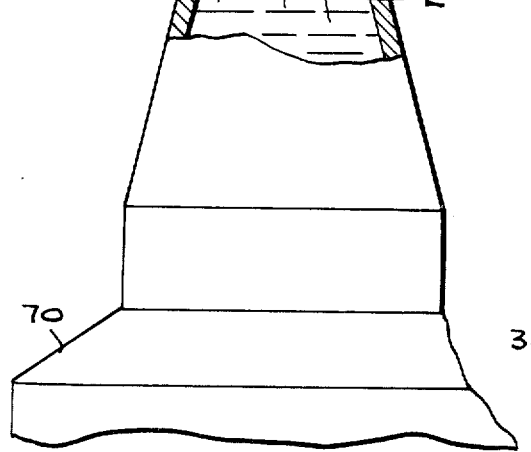
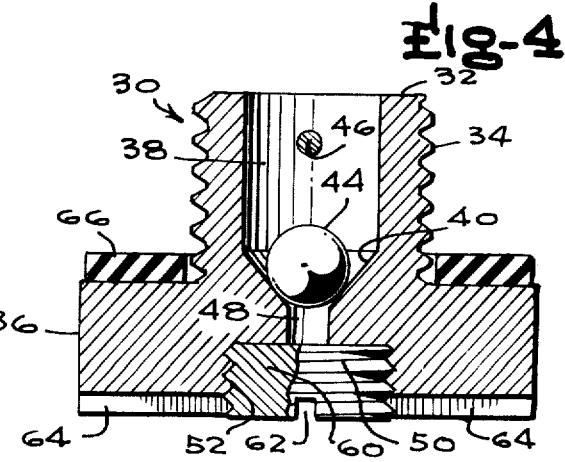

REMOVABLE TYPE LUBRICATING FITTING

This is a continuation-in-part of earlier filed application Ser. No. 367,186, filed June 5, 1973, now abandoned.

This combination is of great value in that it provides the following improvements over marine power-transmission housing lubrication systems heretofore known.

1. Leakage of lubricant while filling and/or checking the level of lubricant contained within the reservoir is virtually eliminated.
2. Removal of the fluid contents of the reservoir is easily controlled, making it convenient to examine the efflux for possible contaminents such as water.
3. The process of adding lubricant to the reservoir from an outside source is made significantly easier since lubricant is prevented from flowing back into the container from which it was dispensed. This is particularly helpful when lubricant is dispensed from flexible tubes normally used to package marine gear lubricant, since the tendency is for the lubricant to quickly return to the tube when the "hand squeeze" is relaxed.
4. Metal particles may be removed from the lubricant to prolong the life of the lubricated components within the housing and alert anyone servicing the housing to potential troubles arising from component wear.

This invention is in the field of marine equipment, and it is specifically directed towards an improved system for servicing the lubricant contained within a "marine power-transmission housing". The most obvious application of this invention is to an outboard or inboard/outboard drive unit used in a marine propulsion system and commonly referred to as a "lower-unit". As such, the comments contained within this disclosure section will be specifically directed towards the embodiment of the invention as applied to lower-unit housings. Numerous embodiments of the subject invention will undoubtedly occur to those of skill in the art, however, and it should be understood that the spirit and scope of the invention is to be limited solely in the light of the appended claims.

Throughout this application, including the Disclosure and Claims sections, the terms marine power-transmission housing and lower-unit are defined as follows:

1. Marine power-transmission housing: Any gearcase or bearing support housing intended for marine application and containing singularly or in combination any (a) shaft, (b) gear, (c) bearing or (d) seal.
2. Lower-unit: Any gearcase assembly designed to operate partially or fully submerged under water, said gearcase containing a geartrain mounting a propellor and used in conjunction with either outboard or inboard/outboard marine propulsion installations.

All moving parts contained with a lower-unit housing are generally immersed in a lubricant contained within the housing reservoir. This lubricant is normally S.A.E. 90 hypoid gear oil or its equivalent, such lubricant being of medium viscosity (on the order of heavy cream) and generally containing a substantial number of chemical additives that make it disagreeable in both appearance and odor, as well as extremely difficult to remove from tools, floors, parts and the skin of those coming in contact with it. In addition, the lubricant ordinarily cannot be removed from clothing by washing or dry cleaning, thereby making it highly desirable to minimize any and all contact with it. Accordingly, and for reasons of convenience, virtually all such lubricant sold for retail use is packaged in squeezable plastic containers having long plastic dispensing nozzles.

The present method of servicing a lower-unit reservoir utilizes two removable plugs mounted in upper and lower access openings in the housing; the upper opening being located at the desired lubricant level and used both to vent the reservoir and to establish the correct lubricant level within it; and the lower opening being located at the lower portion of the reservoir and used to add or remove lubricant from the reservoir. In addition, the lower opening is used to drain water from the reservoir, such water exiting first since the density of water is greater than that of lubricant. The presence of water within the reservoir indicates leaking seals and usually results in costly mechanical failure of the geartrain if not eliminated. Once all water, if any, has been drained, the nozzle of a squeezable container of lubricant is inserted into the lower access opening and lubricant injected into the opening until it emerges from the upper access opening, indicating that the reservoir is filled to the upper level. The upper plug is then reinstalled, the nozzle withdrawn from the lower access opening, and the lower plug quickly reinstalled to minimize undesirable loss of lubricant during the process.

Since it is desirable that the lower-unit housing be streamlined to the fullest extent possible in order to reduce drag during operation, it has not been practical to employ any other method of servicing the lubricant within a lower-unit. Consequently, both plugs must be removed for every servicing operation, such removal always resulting in a significant loss of lubricant and making contact with the obnoxious lubricant a virtual certainty. Secondly, it is almost impossible under these conditions to properly examine the efflux to determine the presence and extent of water within the reservoir, since emphasis must be placed on quickly inserting the lubricant dispensing nozzle into the lower access opening in order to minimize loss of lubricant. A final disadvantage with present servicing methods resides in the fact that lubricant quickly flows back into the container from which it was dispensed whenever the squeeze on the container is relaxed, making it quite difficult to add lubricant to a lower-unit reservoir from any but a full container of lubricant.

Quite obviously, the servicing of a lower-unit reservoir using present methods is a most difficult and disagreeable procedure. Consequently, many lower-units do not receive adequate lubrication maintenance, with resulting mechanical failures being a non-infrequent occurrence. Because of this, there has been a continuing unmet need for improved means for servicing the lubricant reservoir of lower-units, and other marine power-transmission housings in general. It is this need to which the subject invention is directed: a new and improved lubrication system for marine power-transmission housings.

In essence, this invention is a combination of (1) a marine power-transmission housing with (2) a unique fluid flow control device oriented flush with the housing exterior surface and constructed so as to allow (3) an essentially leak-free junction between the fluid flow control device and the dispensing source of lubricant. This unique combination results in a new and improved lubrication system for marine power-transmission housings in general, and lower-units in particular, since it eliminates the three disadvantages previously discussed as being associated with the presently employed system.

One embodiment of the invention, as associated with a lower-unit housing for purposes of illustration, involves replacing the conventional lower access plug of the housing with a unique fitting containing a fluid flow control device constructed so as to allow an essentially leak-free junction between the fitting and the dispensing nozzle of a squeezable plastic container of lubricant. The fitting consists of an externally threaded cylindrical member having an integral coaxial flange member of larger diameter than the threaded member, the threaded member being received into the threaded lower access opening of the lower-unit housing. The threaded member forms the inner end of the fitting and the flange member forms the outer end of the fitting. The flange member has a coaxial internally threaded recess therein containing an externally threaded closure plug which protects the fluid flow control device from damage by foreign objects as well as prevents the passage of water and lubricant through the fitting. This closure plug is removed only for servicing operations to allow the nozzle of a squeezable plastic tube container of lubricant to be threaded into the recess, thereby producing an essentially leak-free junction. The fitting contains a coaxial cylindrical valve chamber extending outward from the inner end of the fitting and joined to the threaded recess by a coaxial converging hollow passageway of smaller diameter than the chamber; the junction of the passageway with the chamber forming a cylindrical sealing surface. The chamber contains a spherical ball sized so as to freely move within the chamber with sufficient to permit the passage of lubricant between the ball and the walls of the chamber. The ball is retained within the chamber by a rod extending diametrically across the chamber near the inner end of the fitting so as to allow the ball to move away from the sealing surface when lubricant flows inward through the passageway; the rod being of sufficiently small diameter so as not to appreciably restrict flow of lubricant through the fitting.

Any tendency of the lubricant to flow through the fitting from within the housing towards the exterior thereof results in viscous forces which transport the ball to the sealing surface; the ball then being held against the sealing surface by the pressure differential developed by the head of lubricant contained within the reservoir, thereby sealing the passageway against flow of lubricant outward therethrough. Gravitational forces acting on the ball affect the rate at which the ball is transported to the sealing surface as well as the pressure differential necessary for the ball to remain against said surface, depending on the orientation of the device with respect to the direction of gravitational forces. If a sufficient head of lubricant is present within the reservoir so that pressure forces acting upon the ball are greater than the gravitational forces acting upon it, the fitting will seal against loss of lubricant even when mounted with its other end upward. This is generally not the case, however, since the fitting mounted in the lower access opening of a lower-unit will normally have its outer end inclined downward from the horizontal, causing gravitational forces to assist viscous and pressure forces in transporting the ball to, and holding it against, the sealing surface.

In the preferred embodiment of the invention, the lubrication fitting comprises a hollow tubular member having an axial passageway with the valve chamber being provided on the innermost end of the axial passageway. The outer end of the valve chamber is defined by axially inwardly converging valve seat means engageable by a stainless steel ball maintained within the valve chamber. The outer end of the valve chamber extends inwardly to define a circular opening of a diameter less than the diameter of the spherical ball member. Additionally, slots extend radially outwardly from the innermost end of the valve chamber for permitting an easy flow of lubricant from the interior of the housing into or from the valve chamber. The outer ends of the tubular member constitutes a flange of larger diameter than the inner end portion which is received in a larger diameter portion of the opening provided in a marine power-transmission housing in which the device is mounted. Seal means is provided between the flange in the housing and the entire fitting is reset so as not to protrude beyond the outer surface of the power-transmission housing. A threaded closure plug is received in the outer end of the axial passageway and includes a magnet engageable with the spherical ball member to magnetize the ball member while the magnet is in contact therewith. However, upon removal of the threaded closure plug, the stainless steel ball member rapidly demagnetizes so that any ferrous particles adhering thereto are then released to be carried from the device by flushing discharge of the lubricant through the axial passageway. An O-ring type sealing means is provided between a flange of the closure plug and a radial flange of the fitting for insuring that water cannot enter the power-transmission housing through the closure plug and the axial passageway.

Attention is directed to the fact that hydrodynamic forces, and not mechanical forces such as generated by a spring, effect the sealing of the fitting against lubricant leakage outward therethrough. This is important, if the ball is to move away from the sealing surface to allow lubricant to flow inward through the fitting, since the use of a spring-loaded ball would require a pressure in excess of that comfortably generated by hand squeezing a container of lubricant. It is necessary to incorporate the aforementioned closure plug within the recess during operation of the lower-unit in order to prevent water pressure or foreign objects from forcing the ball away from the sealing surface thereby allowing water to flow into the reservoir.

Servicing the lubricant reservoir using the disclosed system would normally begin with the removal of both the housing upper access vent plug and the closure plug from the fluid flow control device fitting. If desired, the ball can be engaged by a thin wire or the like to move the ball a small distance away from the sealing surface to permit a controlled accurate drainage of water, if any, from the housing. The drainage can be terminated as soon as lubricant appears, and the nozzle of a squeezable tube container of lubricant inserted into the recess of the fitting. Lubricant can then be added to the reservoir by squeezing the container until lubricant emerges from the upper access opening. Any relaxation of the squeeze cannot result in lubricant flowing back into the container since the ball would engage with the sealing surface and prevent such reverse flow. The nozzle can then be removed and both plugs reinstalled at leisure. No undesirable loss of lubricant has resulted during the entire servicing operation.

A better understanding of the manner in which the preferred embodiment of the invention achieves the object of the invention will be enabled when the following written description is read in conjunction with the appended drawings in which:

FIG. 1 is a side elevation of a typical lower-unit housing in which the conventional lower access opening plug has been replaced by one embodiment of the fluid flow control device;

FIG. 2 is an exploded perspective view of all parts comprising one embodiment of the fitting;

FIG. 3 is an assembled perspective view of the fitting of FIG. 2;

FIG. 4 is a bisecting sectional view taken along lines 4—4 of FIG. 3;

FIG. 5 is a bisecting sectional view of one embodiment of the fitting installed in a lower-unit housing and receiving lubricant from the nozzle of a squeezable container of lubricant;

Figure 6:
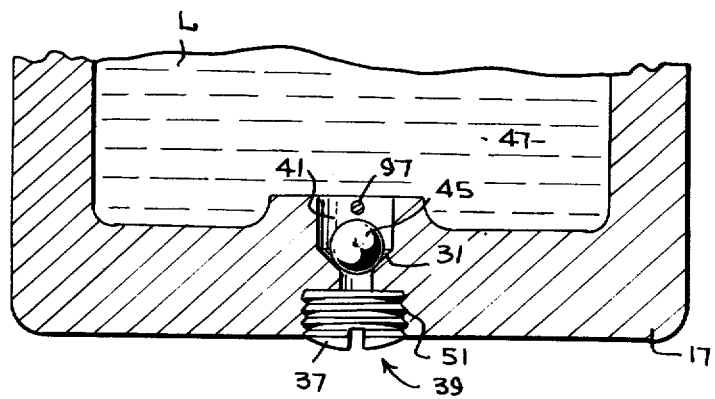
FIG. 6 is a bisecting sectional view of an alternate embodiment of a fluid flow control device integrally machined into a marine power-transmission housing.

Attention is initially invited to FIG. 1 of the drawings which illustrates a typical lower unit assembly 10 comprising a housing 20 mounting the propeller 24 and enclosing a lubricant reservoir 43 and a geartrain within its interior. An upper access opening 26 is provided with a conventional plug 27, and a lower access opening 28 is provided with the preferred embodiment of the fluid flow control device, fitting 30, threadably mounted in opening 28, and from which closure plug 60 has been removed and into which the nozzle of a squeezable container of lubricant 70 has been inserted. Upper access opening 26 is for the purpose of venting the interior of the housing during the draining of water or lubricant L from reservoir 43 and during the addition of lubricant L' to reservoir 43. Lubricant L and water are removed from reservoir 43 and lubricant L' added to reservoir 43 through fitting 30.

Turning now to FIGS. 2 through 5, fitting 30 includes a cylindrical member 32 having external threads 34 and an integral coaxial radially extending flange member 36 with a seal 66 being provided for engaging the outer surface of housing 20 when the fitting is mounted in housing 20 as illustrated in FIG. 5. An aperture extends axially through the length of fitting 30 and includes a coaxial cylindrical chamber 38 having a conical sealing surface 40 with a freely moving spherical ball 44 being contained within chamber 38. Retaining means comprising a rod 46 extending diametrically across the end of chamber 38 prevents ball 44 from exiting chamber 38. Coaxial hollow passageway 48 of smaller diameter than chamber 38 and ball 44 connects chamber 38 with a coaxial recess 50 that is provided with internal threads 52 for receiving a protective externally threaded cylindrical closure plug 60, or during servicing operations receiving nozzle 72 of a lubricant container 70.

A drive slot 62 is provided in the outer end of closure plug 60 and similar drive slots 64 are provided in flange 36 for use during installation or removal of fitting 30 in housing 20. Drive slots 64 enable fitting 30 to be tightly threaded into lower access opening 28 with seal 66 being compressed to prevent the leakage of fluids around the mating threads 28 and 34. Once fitting 30 has been installed into housing 20, it is not necessary to remove it for servicing operations, though it may be removed to expedite the complete drainage of lubricant L from reservoir 43, if desired.

In use, the inventive system is normally employed for servicing the lubricant L in reservoir 43 and possibly adding lubricant L' if needed, as well as for draining lubricant L and/or water as desired. Such an operation is started by initially removing upper plug 27 in upper access opening 26 followed by removal of closure plug 60 from recess 50 of fitting 30 in an obvious manner. Upon removal of closure plug 60, little or no lubricant L leaks from reservoir 43 since ball 44 will be transported to, and held against, sealing surface 40 by the hydrostatic forces of the lubricant in reservoir 43.

Following removal of closure plug 60, the user should take a relatively thin wire, or similar member, and insert it through openings 48 and 50 to engage ball 44 and move it a small distance away from sealing surface 40 to permit drainage of any water which might exist within reservoir 43. Since water is heavier than lubricant L, any water within will collect at the lower level of reservoir 43 and will be removed before lubricant L begins to flow. As soon as lubricant L begins to flow through passageway 48, the user is immediately apprised of the fact that all of the drainable water in reservoir 43 has been removed, and the wire or other object holding ball 44 open is removed to permit ball 55 to immediately seal against surface 40.

Lubricant L' is added to reservoir 43 from a container 70 having a plastic nozzle 72 by first rotating nozzle 72 into threads 52 which engage the soft plastic to provide a seal between the threads and the plastic as shown in FIG. 5. Upon squeezing of container 70, lubricant L' within the container is extruded through nozzle 72, through passageway 48, and against ball 44 to move ball 44 away from sealing surface 40 thereby permitting lubricant L' to flow through chamber 38 and into lubricant reservoir 43 of housing 20. It should be noted that any release of squeeze on container 70 will not result in lubricant L flowing back into container 70 since ball 44 will immediately seal against surface 40 in response to the attempted reverse flow of lubricant L.

As soon as lubricant L becomes visible at upper access opening 26, the user is apprised of the fact that reservoir 43 has been filled to its desired level. The nozzle 72 is then removed from recess 50 with ball 44 preventing any leakage of lubricant L from reservoir 43. A positive closure of passageway 48 is then effected by replacing closure plug 60 and tightening same into recess 50 of fitting 30 as illustrated in FIGS. 3 and 4.

It is to be noted that ball 44 is not provided with any spring or other mechanical means for urging ball 44 against sealing surface 40. This construction permits the easy movement of ball 44 away from sealing surface 40 during the drainage of water and/or lubricant L from reservoir 43. Moreover, the absence of any spring or other biasing means enables lubricant L' to be introduced into reservoir 43 from container 70 with a minimum of squeeze pressure since negligible pressure is necessary to force ball 44 from sealing surface 40 under such conditions.

The preferred embodiment illustrated in FIGS. 8–11 is similar in structure and operation to the first embodiment of FIGS. 1-4 but differs from the first embodiment in several respects. Specifically, the embodiment of FIGS. 8–11 is mounted in a recess in a marine power-transmission 20' having an enlarged outer portion 70 and a smaller threaded portion 73 which receives the external threads 74 of a tubular hollow member generally designated 76. The hollow tubular member 76 includes an inner cylindrical portion 78 received inwardly of housing 20' and from which the threads 74 extend outwardly. Tubular member 76 also includes an outer portion comprising a radially extending flange 80 received in the enlarged portion 70 of the opening in the housing. A seal means 79 is provided between the flange 80 and housing 20'.

The hollow tubular member 76 includes an axial passageway extending along its entire length with the axial passageway including a valve chamber 81 in which a stainless steel spherical ball valve member 82 is positioned.

The inner end of the tubular member 76 converges inwardly at 84 to retain the spherical ball 82 in chamber 81. Additionally, the tubular member 76 is provided with diametrically opposed flow slots 86 extending from its inner end toward the outer end (with respect to the housing) for permitting an easy flow of fluid into and out of the valve chamber 81 from the surrounding portions of the housing 20°.

Figure 11:
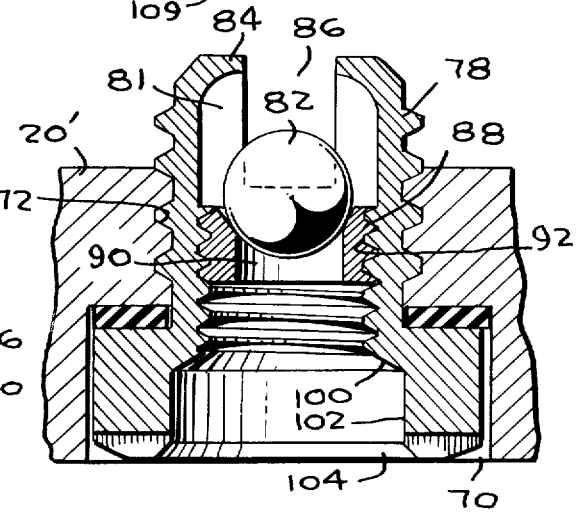
FIG. 11 is a bisecting sectional view of the embodiment of FIG. 8 similar to FIG. 10, but with the closure plug being removed from the device.

A threaded valve seat ring 80 having an axial passageway 90 is mounted medially of the hollow tubular member 76 to provide an inward converging portion of the medial passageway as best illustrated in FIG. 11. Valve seat ring 88 is threadably connected to threads 92 of the tubular member 76 which extend from a point adjacent the valve chamber 81 outwardly to a point terminating adjacent an outwardly diverging sealing surface 100 as shown in FIG. 11. The axial passageway in the hollow tubular member 76 from the outer edge of the surface 100 constitutes a cylindrical surface 102 and an extreme outermost flaired portion 104.

Figure 10:
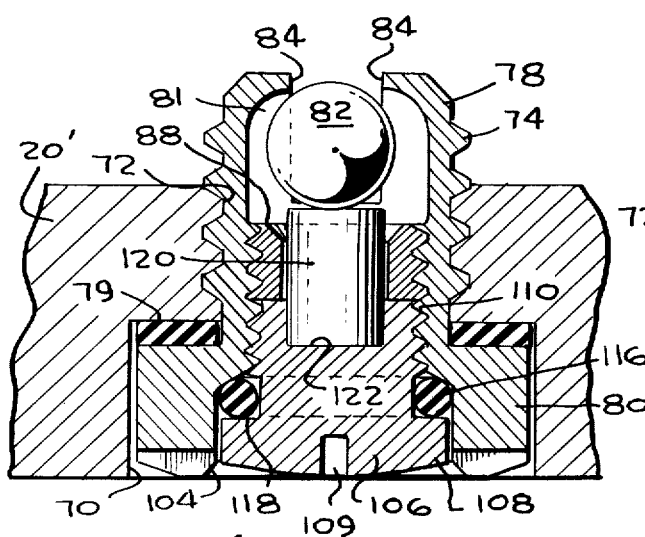
FIG. 10 is a bisecting sectional view of the embodiment of FIG. 8 as mounted in a power-transmission housing.

A closure plug 106 having a head flange 108 with a slot 109 and a threaded inner portion 110 is receivable in the internal threads 92 of the hollow tubular member 76. An O-ring sealing member 116 is compressed between the sealing surface 100 and the inner face 118 of the flange of the closure plug 106 when the closure plug is in the position illustrated in FIG. 10. A magnet 120 is fixedly mounted in a recess 122 in the closure plug 106 to extend into the valve chamber 80 so as to engage the stainless steel spherical ball 82 as shown in FIG. 10 when the closure plug is in sealing position in the tubular member 76. Engagement of magnet 120 with the stainless steel ball 82 immediately magnetizes the ball 82 so that ferrous particles in the lubricant within housing 20' passing in the proximity of ball 82 will be attracted to the ball and retained on the surface thereof. However, the material of which the ball is formed is such that upon removal of the closure plug 106, and disengagement of the magnet 120 from contact with the ball 82, the ball 82 rapidly demagnetizes to release the previously magnetically secured particles so that they can be flushed from the system outwardly through passageway 90 upon movement of the ball 82 out of the valve seat ring 88 by extending a thin wire or the like inwardly through the axial passageway to engage the ball 82.

Therefore, it will be seen that the preferred embodiment of FIGS. 8–11 provides substantial advantages in removal of magnetic particles from the housing. The O-ring 116 provides advantages over the embodiment of FIG. 4 etc. in preventing the flow of water into the housing in high speed operation of the marine-power system in which the device is incorporated.

An alternate embodiment of the inventive system as depicted in FIG. 6 consists of a fluid flow control device 39 integrally machined into a marine power-transmission housing 17, having a closure plug 37 contained within a threaded recess 51. As with the preferred embodiment, this fluid flow control device 39 consists of a freely moving spherical ball 45 retained by a rod 97 within a cylindrical chamber 41, the ball 45 preventing reverse flow of lubricant L out of the reservoir 47 by sealing against a conical sealing surface 31.

Figure 7:
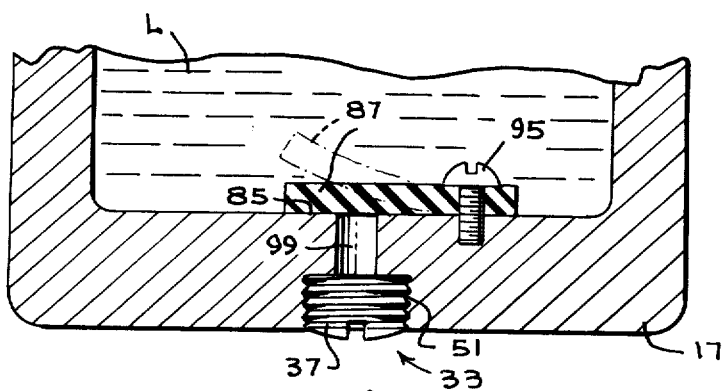
FIG. 7 is a bisecting sectional view of a second alternate embodiment of a fluid flow control device associated with a marine power-transmission housing.
Figure 8:
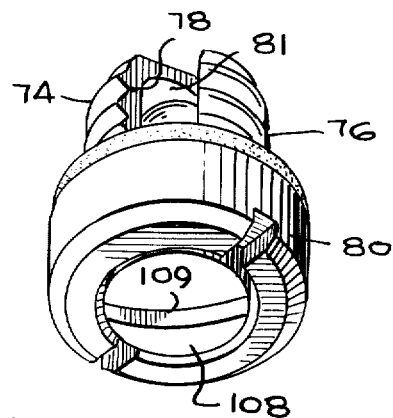
FIG. 8 is a lower perspective view of the preferred embodiment of the invention.
Figure 9:
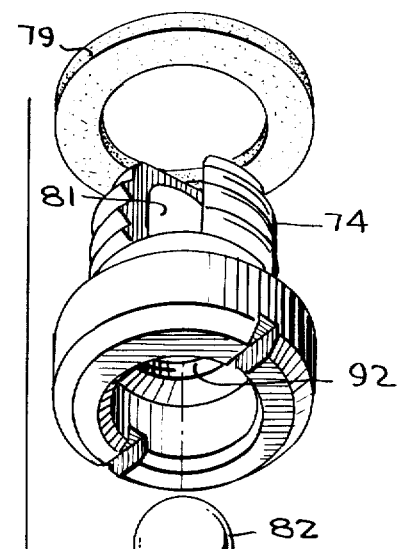
FIG. 9 is an exploded perspective view of the embodiment of FIG. 8.

Another embodiment of the inventive system as depicted in FIG. 7 consists of a fluid flow control device 33 integrally machined into a marine power-transmission housing 17 having a closure plug 37 contained within a threaded recess 51. The fluid flow control device 33 consists of a hollow passageway 99 extending through housing 17, and having thin flexible sealing element 87 attached onto the interior of housing 17 by screw 95, as depicted. The sealing element 87 prevents reverse flow of lubricant L out of reservoir 47 by sealing against housing interior surface 85. Sealing element 87 deflects inwardly to allow flow of lubricant L' into reservoir 47.

Numerous other modifications of the subject invention will undoubtedly occur to those of skill in the art, and it should be understood that the spirit and scope of the invention is to be limited solely in light of the appended claims.

What is claimed is:

1. A lubrication fitting for a marine power-transmission housing, said fitting being a fluid control device that prevents flow of fluid therethrough at all times except when specifically actuated for the purpose of passing fluid therethrough; upon such actuation, said fitting including flow control means for automatically permitting flow therethrough of lubricant from an outside source and for automatically preventing flow of fluid therethrough in the reverse direction unless additionally actuated specifically for the purpose of allowing such flow; and said fitting including junction means for providing an essentially leakfree junction with an outside dispensing source of lubricant, said fitting receiving lubricant at said junction for passage therethrough, said junction being located at the exterior termination of said fitting wherein said fitting consists of an externally threaded cylindrical member having an integral coaxial flange member of larger diameter than said threaded cylindrical member, said flange member beginning at the external termination of said fitting, said threaded member beginning at the internal termination of said fitting, said flange member having a smooth coaxial recess therein converging to a coaxial internally threaded recess to receive the nozzle of the lubricant dispensing source so as to provide an essentially leak-free junction between said fitting and said nozzle, said threaded recess receiving the external threaded portion of a removable closure plug, said removable closure plug sealing said smooth recess by sealing means between said recess and said closure plug to prevent passage of fluid through said fitting unless said closure plug is removed, said fitting containing a coaxial aperture connecting the interior termination of said fitting with said threaded recess, said aperture diverging to a larger cross-sectional area a short distance in from the interior termination of said fitting to form a cylindrical chamber within the apertured member, said chamber converging to a smaller cross-sectional area than said chamber prior to the junction of said aperture with said threaded recess; said chamber containing said sealing element, said sealing element being free to move within said chamber with sufficient clearance to readily permit the passage of fluid between said sealing element and the walls of said chamber, said sealing element sealing said aperture against flow of fluid outward therethrough when held against the converging portion of said aperture; said sealing element being retained within said chamber by the diverging portion of said aperture located near the interior termination of said device so as to allow said sealing element to move away from said converging portion of said aperture when fluid flows inward through said aperture, and torque being applied to said fitting for the purpose of installing said fitting into a threaded hole.

2. The fitting as described in claim 1, said aperture being of circular cross-section and said sealing element being a spherical ball.

3. The fitting as described in claim 2, said converging portion of said aperture being the interior surface of an apertured seat element mounted in the external end of said cylindrical chamber, the inner portions of said fitting at the beginning of said diverging portion of said aperture being slotted radially.

4. The fitting as described in claim 3, said cylindrical chamber being internally threaded, said aperture seat element containing external threads to engage the internal threads of said cylindrical chamber.

5. The fitting as described in claim 4, said sealing means between said closure plug and said smooth recess being an O-ring.

6. The fitting as described in claim 5, said fitting containing magnetic means for the purpose of attracting and removing ferrous metal particles from lubricant adjacent said magnetic means.

7. The fitting as described in claim 6, said magnetic means being comprised of a magnet mounted in said removable closure plug so as to extend through said apertured seat element when said closure plug is positioned in said threaded recess, said magnet engaging said spherical ball to magnetize said ball to aid in the removal of ferrous particles, said ball becoming essentially demagnetized when said magnet is removed from said ball's proximity.

* * * * *